United States Patent
Gehtman et al.

(10) Patent No.: US 12,229,301 B2
(45) Date of Patent: Feb. 18, 2025

(54) ACCESS CONTROL OF PROTECTED DATA USING STORAGE SYSTEM-BASED MULTI-FACTOR AUTHENTICATION

(71) Applicant: EMC IP Holding Company LLC, Hopkinton, MA (US)

(72) Inventors: Yevgeni Gehtman, Modi'in (IL); Maxim Balin, Gan-Yavne (IL); Tomer Shachar, Omer (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 43 days.

(21) Appl. No.: 17/308,114

(22) Filed: May 5, 2021

(65) Prior Publication Data
US 2022/0358235 A1 Nov. 10, 2022

(51) Int. Cl.
*G06F 21/62* (2013.01)
*H04L 9/40* (2022.01)

(52) U.S. Cl.
CPC .......... *G06F 21/6227* (2013.01); *H04L 63/08* (2013.01); *H04L 2463/082* (2013.01)

(58) Field of Classification Search
CPC .. G06F 21/6227; G06F 21/31; G06F 21/6218; G06F 21/78; G06F 21/53; H04L 63/08; H04L 2463/082
See application file for complete search history.

(56) References Cited

U.S. PATENT DOCUMENTS

| 6,971,018 B1 * | 11/2005 | Witt ........................ G06F 21/52 707/999.203 |
| 7,320,008 B1 * | 1/2008 | Colgrove ............ G06F 21/6227 707/999.102 |
| 7,536,722 B1 * | 5/2009 | Saltz ........................ G06F 21/33 726/20 |
| 8,371,501 B1 * | 2/2013 | Hopkins ............. H04L 63/0861 235/382 |

(Continued)

OTHER PUBLICATIONS https://www.cisco.com/c/en/us/products/security/what-is-multi-factor-authentication.html#~methods, downloaded Apr. 21, 2021.

(Continued)

*Primary Examiner* — Aravind K Moorthy
(74) *Attorney, Agent, or Firm* — Ryan, Mason & Lewis, LLP

(57) ABSTRACT

Techniques are provided for access control of protected data using storage system-based multi-factor authentication. One method comprises obtaining, in a storage system, an input/output request for data; determining, by the storage system, whether a multi-factor authentication is required for the requested data; initiating, by the storage system, a multi-factor authentication of a user associated with the input/output request, in response to a result of the determining, to obtain a verification result; and processing, in the storage system, the input/output request for the data based at least in part on the verification result. The data may be marked as protected data using a manual process and/or an automated process that processes one or more smart tags associated (Continued)

with the data. The marking of the data as protected data may comprise marking a partition comprising the data, marking a protected folder comprising the data, and/or marking a protected file comprising the data.

20 Claims, 6 Drawing Sheets

(56) References Cited

U.S. PATENT DOCUMENTS

| | | | | |
|---|---|---|---|---|
| 8,843,752 | B1* | 9/2014 | Priyadarshi | H04L 63/0823 713/168 |
| 9,003,106 | B1* | 4/2015 | Clark | G06F 12/1416 711/103 |
| 9,122,866 | B1* | 9/2015 | Kolman | G06F 21/46 |
| 9,160,726 | B1* | 10/2015 | Kaufman | H04L 63/08 |
| 9,264,419 | B1* | 2/2016 | Johansson | G06F 21/45 |
| 9,336,092 | B1* | 5/2016 | Li | G06F 21/602 |
| 9,349,035 | B1* | 5/2016 | Gerber | H04L 63/0861 |
| 9,402,181 | B1* | 7/2016 | Yi | H04L 63/08 |
| 9,419,968 | B1* | 8/2016 | Pei | G06F 21/31 |
| 9,426,132 | B1* | 8/2016 | Alikhani | G06F 21/31 |
| 9,639,689 | B1* | 5/2017 | Herskovic | H04W 12/06 |
| 9,684,593 | B1* | 6/2017 | Chen | G06F 11/1469 |
| 9,794,288 | B1* | 10/2017 | Hassan, III | H04L 63/20 |
| 10,069,868 | B2* | 9/2018 | Smith | H04L 63/20 |
| 10,096,026 | B1* | 10/2018 | Benkreira | G06F 21/316 |
| 10,169,562 | B2* | 1/2019 | Bandyopadhyay | G06F 21/445 |
| 10,200,359 | B1* | 2/2019 | Sokolov | H04L 63/0853 |
| 10,212,588 | B2* | 2/2019 | Grim | H04W 12/06 |
| 10,268,995 | B1* | 4/2019 | Zimmerman | G06Q 20/227 |
| 10,360,366 | B1* | 7/2019 | Dubey | H04L 41/0663 |
| 10,387,980 | B1* | 8/2019 | Shahidzadeh | G06Q 40/123 |
| 10,484,367 | B1* | 11/2019 | Nguyen | G06F 3/04817 |
| 10,521,796 | B1* | 12/2019 | Newman | H04L 63/107 |
| 10,547,599 | B1* | 1/2020 | Mehta | H04L 63/08 |
| 10,567,375 | B1* | 2/2020 | Mossler | H04L 63/101 |
| 10,616,214 | B1* | 4/2020 | Jiang | G06F 21/40 |
| 10,681,031 | B2* | 6/2020 | Sreedhar | H04L 63/107 |
| 10,698,701 | B1* | 6/2020 | De Jong | G06F 9/4451 |
| 10,708,278 | B1* | 7/2020 | Cuan | H04W 12/06 |
| 10,754,573 | B2* | 8/2020 | Dalmatov | G06F 3/0659 |
| 10,795,856 | B1* | 10/2020 | Smith | G06F 11/1458 |
| 10,824,702 | B1* | 11/2020 | Shahidzadeh | G06F 21/31 |
| 10,832,509 | B1* | 11/2020 | Read | G07C 9/20 |
| 10,853,786 | B2* | 12/2020 | Mancini | G06Q 20/12 |
| 10,860,382 | B1* | 12/2020 | Sharifi Mehr | G06F 9/5038 |
| 11,049,207 | B1* | 6/2021 | Weldon | H04L 63/1441 |
| 11,080,385 | B1* | 8/2021 | Angara | H04W 12/068 |
| 11,093,309 | B1* | 8/2021 | Katzer | G06N 5/047 |
| 11,201,728 | B1* | 12/2021 | Bouchard | H04L 9/0637 |
| 11,323,434 | B1* | 5/2022 | Vali | H04L 63/083 |
| 11,363,021 | B1* | 6/2022 | Grubin | H04L 9/08 |
| 11,374,980 | B1* | 6/2022 | Appala | H04L 41/0894 |
| 11,405,504 | B1* | 8/2022 | Tripathy | H04L 9/3228 |
| 11,406,196 | B2* | 8/2022 | Canfield | A47C 20/08 |
| 11,552,941 | B2* | 1/2023 | Kumar | G06F 21/62 |
| 11,558,365 | B1* | 1/2023 | McCorkendale | H04L 63/083 |
| 2004/0049700 | A1* | 3/2004 | Yoshida | H04L 63/04 714/E11.125 |
| 2006/0053347 | A1* | 3/2006 | van Ingen | G06F 11/1458 714/47.2 |
| 2006/0070125 | A1* | 3/2006 | Pritchard | H04L 63/0846 726/18 |
| 2009/0138714 | A1* | 5/2009 | Matsushita | H04L 9/083 713/171 |
| 2010/0037324 | A1* | 2/2010 | Grant | G06F 21/6218 726/27 |
| 2010/0071035 | A1* | 3/2010 | Budko | H04L 63/0281 726/4 |
| 2010/0088389 | A1* | 4/2010 | Buller | G06F 16/113 709/216 |
| 2010/0138666 | A1* | 6/2010 | Adams | G07F 7/1091 713/186 |
| 2010/0228730 | A1* | 9/2010 | Muller | G06F 16/93 707/E17.058 |
| 2011/0204140 | A1* | 8/2011 | Hart | G06Q 20/40 235/380 |
| 2011/0231914 | A1* | 9/2011 | Hung | H04W 12/30 726/7 |
| 2012/0042162 | A1* | 2/2012 | Anglin | G06F 21/57 713/165 |
| 2013/0054536 | A1* | 2/2013 | Sengupta | G06F 11/2094 707/654 |
| 2013/0208892 | A1* | 8/2013 | Moriguchi | G06F 21/805 380/277 |
| 2013/0278425 | A1* | 10/2013 | Cunningham | G08B 13/246 340/572.1 |
| 2013/0312061 | A1* | 11/2013 | Casals | G06F 21/40 726/3 |
| 2014/0091903 | A1* | 4/2014 | Birkel | B60R 25/241 340/5.64 |
| 2014/0096177 | A1* | 4/2014 | Smith | H04L 63/08 726/1 |
| 2014/0096212 | A1* | 4/2014 | Smith | G06F 21/35 726/7 |
| 2014/0181925 | A1* | 6/2014 | Smith | H04L 63/0281 726/6 |
| 2014/0181955 | A1* | 6/2014 | Rosati | G06F 21/35 726/18 |
| 2014/0181963 | A1* | 6/2014 | Guo | G06F 21/6209 726/19 |
| 2014/0189799 | A1* | 7/2014 | Lu | H04L 63/102 726/4 |
| 2014/0237591 | A1* | 8/2014 | Niemela | G06F 21/57 726/22 |
| 2014/0245396 | A1* | 8/2014 | Oberheide | G06F 21/40 726/4 |
| 2014/0282868 | A1* | 9/2014 | Sheller | G06F 21/316 726/3 |
| 2015/0012752 | A1* | 1/2015 | Priyadarshi | H04L 63/0823 713/176 |
| 2015/0205957 | A1* | 7/2015 | Turgeman | G06F 21/554 726/23 |
| 2015/0270956 | A1* | 9/2015 | Basmov | G06F 21/74 713/189 |
| 2015/0281279 | A1* | 10/2015 | Smith | H04L 63/08 726/1 |
| 2015/0310196 | A1* | 10/2015 | Turgeman | H04W 12/06 726/19 |
| 2016/0019543 | A1* | 1/2016 | Taylor, III | G06Q 20/40 726/5 |
| 2016/0041970 | A1* | 2/2016 | Tripathy | G06F 40/205 707/755 |
| 2016/0078203 | A1* | 3/2016 | Moloian | H04L 63/102 726/17 |
| 2016/0088019 | A1* | 3/2016 | Li | H04L 63/20 726/1 |
| 2016/0105290 | A1* | 4/2016 | Khalil | H04L 63/0815 713/168 |
| 2016/0164866 | A1* | 6/2016 | Oberheide | H04L 63/0853 726/1 |
| 2016/0180068 | A1* | 6/2016 | Das | H04L 63/0861 726/7 |
| 2016/0260169 | A1* | 9/2016 | Arnold | G06Q 20/381 |
| 2016/0267022 | A1* | 9/2016 | Schoenberger | G06F 3/0647 |
| 2016/0274912 | A1* | 9/2016 | Schoenberger | G05B 19/042 |
| 2016/0286393 | A1* | 9/2016 | Rasheed | H04L 63/0853 |
| 2016/0294562 | A1* | 10/2016 | Oberheide | H04L 9/0863 |
| 2016/0337344 | A1* | 11/2016 | Johansson | H04L 63/0281 |
| 2016/0337353 | A1* | 11/2016 | Coats | H04W 12/06 |
| 2016/0358634 | A1* | 12/2016 | Molgaard | H04N 23/80 |
| 2016/0359844 | A1* | 12/2016 | Saboori | H04L 63/06 |
| 2016/0364927 | A1* | 12/2016 | Barry | G08B 25/10 |
| 2016/0371786 | A1* | 12/2016 | Kusens | G16H 10/60 |
| 2016/0378600 | A1* | 12/2016 | Diederich | G06F 3/0689 714/770 |
| 2017/0012945 | A1* | 1/2017 | Poffenbarger | H04L 9/14 |
| 2017/0061112 | A1* | 3/2017 | Bandyopadhyay | H04L 63/0853 |

(56) References Cited

U.S. PATENT DOCUMENTS

| | | | |
|---|---|---|---|
| 2017/0070497 A1* | 3/2017 | McCallum | H04L 9/3231 |
| 2017/0091182 A1* | 3/2017 | Wurster | H04L 63/10 |
| 2017/0094510 A1* | 3/2017 | Khosravi | H04L 63/04 |
| 2017/0099278 A1* | 4/2017 | Ducatel | G06F 21/6218 |
| 2017/0102898 A1* | 4/2017 | Shimizu | G06F 3/0604 |
| 2017/0126660 A1* | 5/2017 | Brannon | H04L 63/0823 |
| 2017/0169168 A1* | 6/2017 | Batchelor | H04L 63/08 |
| 2017/0228285 A1* | 8/2017 | Merritt | G06F 3/067 |
| 2017/0230357 A1* | 8/2017 | Canfield | G06F 21/31 |
| 2017/0244730 A1* | 8/2017 | Sancheti | H04L 63/205 |
| 2017/0279795 A1* | 9/2017 | Redberg | H04L 63/0861 |
| 2017/0279797 A1* | 9/2017 | Cross, Jr. | G06F 21/6218 |
| 2017/0286711 A1* | 10/2017 | Negrea | H04L 63/10 |
| 2017/0318460 A1* | 11/2017 | Kumar | H04B 10/116 |
| 2017/0346802 A1* | 11/2017 | Gruskin | G06F 8/62 |
| 2017/0374076 A1* | 12/2017 | Pierson | H04L 63/08 |
| 2018/0004972 A1* | 1/2018 | Ruggiero | H04L 63/107 |
| 2018/0007050 A1* | 1/2018 | Ruggiero | H04L 63/205 |
| 2018/0014197 A1* | 1/2018 | Arana | H04L 63/107 |
| 2018/0018344 A1* | 1/2018 | Kilaru | G06F 16/172 |
| 2018/0034859 A1* | 2/2018 | Aronowitz | H04L 63/08 |
| 2018/0046796 A1* | 2/2018 | Wright | G06F 21/45 |
| 2018/0069896 A1* | 3/2018 | Urmanov | G06F 21/31 |
| 2018/0095665 A1* | 4/2018 | Xu | G06F 3/064 |
| 2018/0101850 A1* | 4/2018 | Pisut, IV | G06Q 20/3227 |
| 2018/0109504 A1* | 4/2018 | Poffenbarger | H04L 9/3234 |
| 2018/0151182 A1* | 5/2018 | Wyss | G10L 17/10 |
| 2018/0165115 A1* | 6/2018 | Fusaro | H04L 63/105 |
| 2018/0181958 A1* | 6/2018 | Locke | G06Q 20/401 |
| 2018/0183586 A1* | 6/2018 | Bhargav-Spantzel | G06F 21/32 |
| 2018/0227128 A1* | 8/2018 | Church | H04L 9/3247 |
| 2018/0262486 A1* | 9/2018 | Zhu | G06K 19/10 |
| 2018/0267847 A1* | 9/2018 | Smith | G06F 9/54 |
| 2018/0268637 A1* | 9/2018 | Kurian | G07D 11/20 |
| 2018/0314816 A1* | 11/2018 | Turgeman | G06F 21/40 |
| 2018/0336196 A1* | 11/2018 | Garg | H04L 67/1097 |
| 2018/0373439 A1* | 12/2018 | Xu | G06F 11/1464 |
| 2018/0375845 A1* | 12/2018 | Burns | G07F 17/3241 |
| 2019/0052466 A1* | 2/2019 | Bettger | H04L 9/3247 |
| 2019/0052467 A1* | 2/2019 | Bettger | H04L 9/088 |
| 2019/0065488 A1* | 2/2019 | Colline | G06F 16/1873 |
| 2019/0065731 A1* | 2/2019 | Brocious | H04L 63/0838 |
| 2019/0097802 A1* | 3/2019 | Rowe | H04L 9/3213 |
| 2019/0097987 A1* | 3/2019 | Talur | H04L 63/08 |
| 2019/0101884 A1* | 4/2019 | Miller | G05B 19/054 |
| 2019/0116494 A1* | 4/2019 | Salloum | H04L 63/0838 |
| 2019/0139148 A1* | 5/2019 | Piel | H04W 12/06 |
| 2019/0147153 A1* | 5/2019 | Bai | H04L 63/0861 726/19 |
| 2019/0173679 A1* | 6/2019 | Hennessy | H04L 9/3263 |
| 2019/0223021 A1* | 7/2019 | Raju | H04W 12/102 |
| 2019/0251765 A1* | 8/2019 | Masters | H04L 63/105 |
| 2019/0253509 A1* | 8/2019 | Kumar | H04L 63/08 |
| 2019/0288998 A1* | 9/2019 | Johansson | H04L 63/08 |
| 2019/0327226 A1* | 10/2019 | Brown | G06F 21/31 |
| 2019/0327227 A1* | 10/2019 | Tobkes | H04L 63/0815 |
| 2019/0347124 A1* | 11/2019 | Payet | G06F 12/0893 |
| 2019/0364034 A1* | 11/2019 | Alexander | H04L 63/12 |
| 2019/0384921 A1* | 12/2019 | Danilov | G06F 21/602 |
| 2020/0005310 A1* | 1/2020 | Kumar | G06F 18/23213 |
| 2020/0007536 A1* | 1/2020 | Piel | G06Q 20/401 |
| 2020/0024071 A1* | 1/2020 | Eisenman | G06Q 10/0833 |
| 2020/0042723 A1* | 2/2020 | Krishnamoorthy | G06F 21/45 |
| 2020/0051058 A1* | 2/2020 | Nandakumar | G06Q 20/3226 |
| 2020/0053088 A1* | 2/2020 | Drake | H04L 63/08 |
| 2020/0065502 A1* | 2/2020 | Lockman | G06F 21/60 |
| 2020/0068399 A1* | 2/2020 | Brown | H04L 9/3236 |
| 2020/0076578 A1* | 3/2020 | Ithal | G06F 21/6227 |
| 2020/0082108 A1* | 3/2020 | Griffin | G06F 21/44 |
| 2020/0084206 A1* | 3/2020 | Vaidya | H04L 63/0861 |
| 2020/0084646 A1* | 3/2020 | Melderis | H04W 40/12 |
| 2020/0089897 A1* | 3/2020 | Shelton | H04L 63/02 |
| 2020/0099682 A1* | 3/2020 | Alexander | H04L 63/105 |
| 2020/0110868 A1* | 4/2020 | Varanjani | G06F 21/31 |
| 2020/0151724 A1* | 5/2020 | Edwards | G06Q 20/38215 |
| 2020/0151928 A1* | 5/2020 | Hawker | G06T 1/0021 |
| 2020/0175521 A1* | 6/2020 | Edwards | G06Q 20/047 |
| 2020/0185071 A1* | 6/2020 | Luber | G16H 50/20 |
| 2020/0192732 A1* | 6/2020 | Acosta | G06F 9/546 |
| 2020/0195626 A1* | 6/2020 | Mossoba | H04L 63/083 |
| 2020/0202647 A1* | 6/2020 | Zhong | G07C 9/00309 |
| 2020/0204565 A1* | 6/2020 | Zhong | H04W 4/023 |
| 2020/0210916 A1* | 7/2020 | Brannon | G06Q 10/067 |
| 2020/0210951 A1* | 7/2020 | Perez | H04L 63/0861 |
| 2020/0213124 A1* | 7/2020 | Castinado | H04L 9/3247 |
| 2020/0213334 A1* | 7/2020 | Kutner | H04L 63/101 |
| 2020/0228532 A1* | 7/2020 | Love | H04L 9/3213 |
| 2020/0244625 A1* | 7/2020 | Tummalapenta | H04L 12/4633 |
| 2020/0244650 A1* | 7/2020 | Burris | G10L 17/06 |
| 2020/0252381 A1* | 8/2020 | Machani | H04L 9/3226 |
| 2020/0280555 A1* | 9/2020 | Mossoba | H04L 63/083 |
| 2020/0311246 A1* | 10/2020 | Sharma | G06F 21/602 |
| 2020/0320080 A1* | 10/2020 | Almasan | G06F 16/903 |
| 2020/0329034 A1* | 10/2020 | Kasravi | G06F 11/2023 |
| 2020/0351659 A1* | 11/2020 | Ellison | H04W 12/06 |
| 2020/0364354 A1* | 11/2020 | Schwartz | G06F 21/604 |
| 2020/0366665 A1* | 11/2020 | Vasudevan | H04L 63/0815 |
| 2021/0037010 A1* | 2/2021 | Koshy | H04L 41/082 |
| 2021/0049865 A1* | 2/2021 | Burns | G06Q 30/0185 |
| 2021/0064298 A1* | 3/2021 | Hasegawa | G06F 3/0659 |
| 2021/0096776 A1* | 4/2021 | Kim | G06F 3/067 |
| 2021/0099874 A1* | 4/2021 | Suraparaju | H04W 12/0471 |
| 2021/0124833 A1* | 4/2021 | Togashi | G06F 21/604 |
| 2021/0133357 A1* | 5/2021 | Machani | G06F 21/6263 |
| 2021/0173914 A1* | 6/2021 | Keith, Jr. | H04L 9/50 |
| 2021/0173915 A1* | 6/2021 | Keith, Jr. | G06F 21/31 |
| 2021/0176218 A1* | 6/2021 | Keith, Jr. | H04L 63/0884 |
| 2021/0185529 A1* | 6/2021 | Patil | H04W 8/04 |
| 2021/0191629 A1* | 6/2021 | Vibhor | G06F 3/0659 |
| 2021/0203668 A1* | 7/2021 | Butler | G06F 21/577 |
| 2021/0241266 A1* | 8/2021 | Kamal | G06Q 20/40145 |
| 2021/0258302 A1* | 8/2021 | Ashraf | H04L 63/0815 |
| 2021/0258344 A1* | 8/2021 | Kula | H04L 63/083 |
| 2021/0271662 A1* | 9/2021 | Muse | G16H 50/70 |
| 2021/0286884 A1* | 9/2021 | Lewis | G06F 3/062 |
| 2021/0294910 A1* | 9/2021 | Subramanian | G06F 21/6218 |
| 2021/0304017 A1* | 9/2021 | Stahlhut | G06N 5/04 |
| 2021/0314149 A1* | 10/2021 | Yee | H04W 12/02 |
| 2021/0320801 A1* | 10/2021 | Wyss | G06V 40/171 |
| 2021/0397692 A1* | 12/2021 | Tan | G06F 21/36 |
| 2021/0400049 A1* | 12/2021 | Denning | H04L 63/0838 |
| 2021/0406894 A1* | 12/2021 | Calvert | G06Q 20/3224 |
| 2022/0029822 A1* | 1/2022 | Ubbens | H04L 9/3247 |
| 2022/0058132 A1* | 2/2022 | Roberts | G06F 21/0895 |
| 2022/0121752 A1* | 4/2022 | Pardini | G06F 21/606 |
| 2022/0131871 A1* | 4/2022 | Huang | H04W 12/06 |
| 2022/0137878 A1* | 5/2022 | Shimizu | G06F 3/067 711/154 |
| 2022/0138345 A1* | 5/2022 | Krishnan | G06K 9/6228 726/26 |
| 2022/0141029 A1* | 5/2022 | Dahmen | G06F 8/60 713/176 |
| 2022/0191027 A1* | 6/2022 | Gan | H04L 63/0869 |
| 2022/0209960 A1* | 6/2022 | Zuckerman | H04L 9/3271 |
| 2022/0237608 A1* | 7/2022 | Rule | G06Q 20/3278 |
| 2022/0239639 A1* | 7/2022 | Jasleen | G06F 21/36 |
| 2022/0247785 A1* | 8/2022 | Ly | H04L 63/0245 |
| 2022/0247789 A1* | 8/2022 | Itoi | G06F 3/04847 |
| 2022/0247790 A1* | 8/2022 | Dhokia | H04L 63/08 |
| 2022/0292196 A1* | 9/2022 | Bhagi | G06F 11/1451 |
| 2022/0311776 A1* | 9/2022 | Kagan | H04L 63/0815 |

OTHER PUBLICATIONS https://support.huawei.com/enterprise/en/doc/EDOC1100140613/e53e49d7/how-do-i-log-in-to-the-storage-system-through-multi-factor-authentication, downloaded Apr. 21, 2021.

https://docs.microsoft.com/en-us/azure/active-directory/authentication/concept-mfa-howitworks, downloaded Apr. 21, 2021.

(56) References Cited

OTHER PUBLICATIONS https://cloudstorageinfo.org/multi-factor-authentication, downloaded Apr. 21, 2021.

* cited by examiner

ACCESS CONTROL OF PROTECTED DATA USING STORAGE SYSTEM-BASED MULTI-FACTOR AUTHENTICATION

FIELD

The field relates generally to information processing techniques and more particularly, to the protection of data in such information processing systems.

BACKGROUND

Data protection techniques are often employed to secure data in a storage system, typically using encryption and other access control functions. Many organizations, however, desire additional protection for the storage of sensitive information. In some regions, regulations may require such additional protection for the storage of personal information.

A need exists for improved techniques for protecting data in a storage system.

SUMMARY

In one embodiment, a method comprises obtaining, in a storage system, at least one input/output request for data; determining, by the storage system, whether a multi-factor authentication is required for the requested data; initiating, by the storage system, a multi-factor authentication of a user associated with the at least one input/output request, in response to a result of the determining, to obtain a verification result; and processing, in the storage system, the at least one input/output request for the data based at least in part on the verification result.

In some embodiments, a marking of the data as protected data is obtained. The marking of the data as protected data may be performed by a manual process and/or an automated process that processes one or more smart tags associated with the data. The marking of the data as protected data may comprise marking a partition comprising the data, marking a protected folder comprising the data, and/or marking a protected file comprising the data.

In at least one embodiment, the determining whether the multi-factor authentication is required for the requested data further comprises determining whether the data is part of one or more of a protected partition, a protected folder, and a protected file.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for access control of protected data using storage system-based multi-factor authentication.

In one or more embodiments, techniques are provided for multi-factor authentication-based protection of stored data in a storage system. In this manner, access to sensitive data is increased by adding an independent layer of protection in the storage system. Among other benefits, the disclosed techniques add multi-factor authentication protection to the existing access control mechanisms and thereby provide a user with flexible and strong protection of sensitive data on the storage system. A number of threats may be mitigated using the disclosed techniques, such as password theft and privilege escalation (e.g., exploiting a weakness to gain access to resources normally protected from an application or user).

Figure 1:
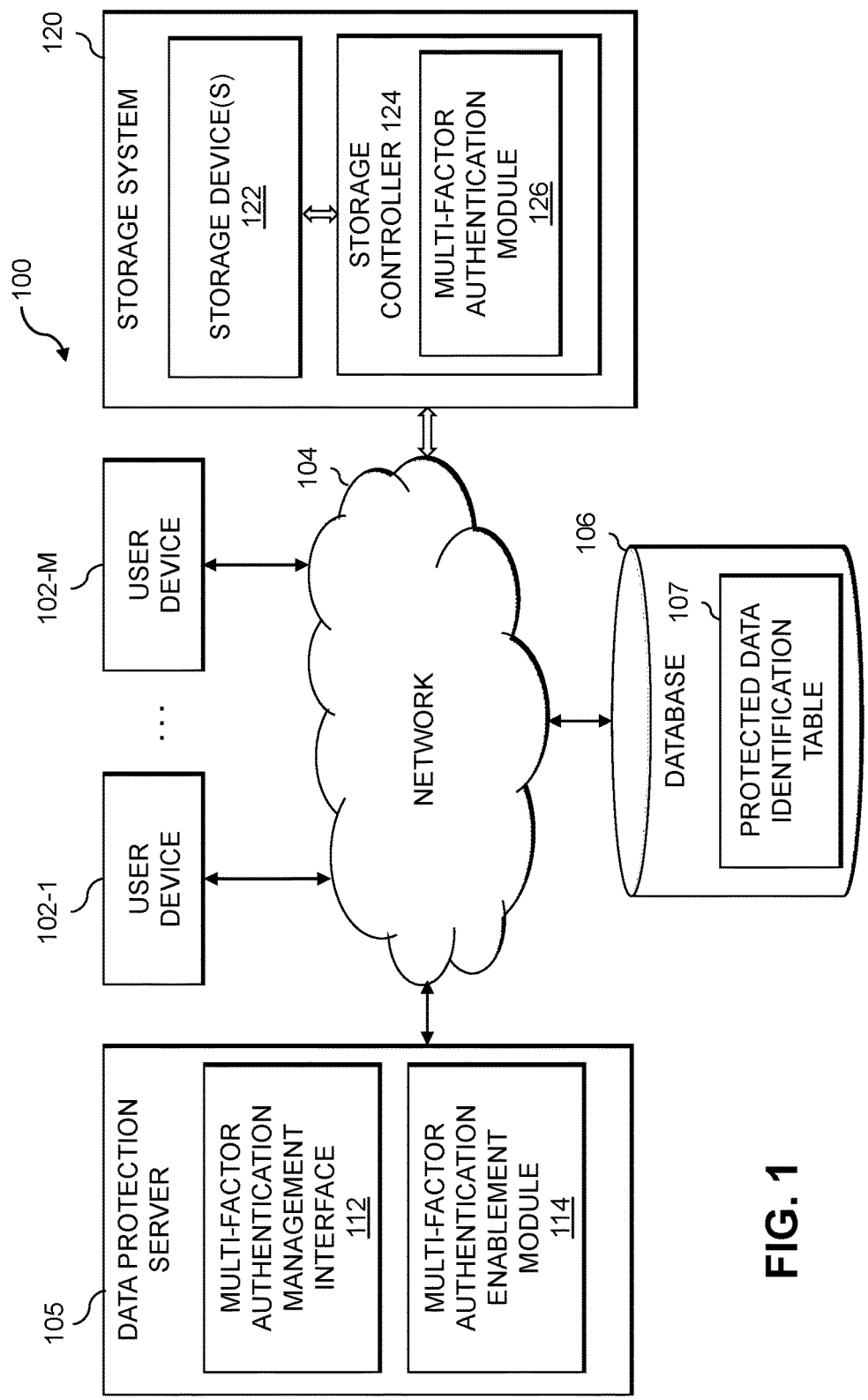
FIG. 1 illustrates a computer network configured for access control of protected data using storage system-based multi-factor authentication in accordance with an illustrative embodiment.

FIG. 1 shows a computer network (also referred to herein as an information processing system) 100 configured in accordance with an illustrative embodiment. The computer network 100 comprises a plurality of user devices 102-1, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is a data protection server 105, a database 106, and a storage system 120.

The user devices 102 may comprise, for example, host devices and/or other devices such as mobile telephones, laptop computers, tablet computers, desktop computers or other types of computing devices. Such devices are examples of what are more generally referred to herein as "processing devices." Some of these processing devices are also generally referred to herein as "computers." When the user devices 102 are implemented as host devices, the host devices may illustratively comprise servers or other types of computers of an enterprise computer system, cloud-based computer system or other arrangement of multiple compute nodes associated with respective users.

For example, the host devices in some embodiments illustratively provide compute services such as execution of one or more applications on behalf of each of one or more users associated with respective ones of the host devices. Such applications illustratively generate input/output (IO) operations that are processed by the storage system 120. The term "input/output" as used herein refers to at least one of input and output. For example, IO operations may comprise write requests and/or read requests directed to logical addresses of a particular logical storage volume of the storage system 120. These and other types of IO operations are also generally referred to herein as IO requests.

The user devices 102 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The network 104 in some embodiments therefore comprises combinations of multiple different types of networks, each comprising processing devices configured to communicate using internet protocol (IP) or other related communication protocols.

The storage system 120 illustratively comprises processing devices of one or more processing platforms. For example, the storage system 120 can comprise one or more processing devices each having a processor and a memory, possibly implementing virtual machines and/or containers, although numerous other configurations are possible.

The storage system 120 can additionally or alternatively be part of cloud infrastructure such as an Amazon Web Services (AWS) system. Other examples of cloud-based systems that can be used to provide at least portions of the storage system 120 include Google Cloud Platform (GCP) and Microsoft Azure.

The user devices 102 and the storage system 120 may be implemented on a common processing platform, or on separate processing platforms. The user devices 102 (for example, when implemented as host devices) are illustratively configured to write data to and read data from the storage system 120 in accordance with applications executing on those host devices for system users.

The storage system 120 comprises a plurality of storage devices 122 and an associated storage controller 124. The storage devices 122 store data of a plurality of storage volumes, such as respective logical units (LUNs) or other types of logical storage volumes. The term "storage volume" as used herein is intended to be broadly construed, and should not be viewed as being limited to any particular format or configuration.

The storage devices 122 of the storage system 120 illustratively comprise solid state drives (SSDs). Such SSDs are implemented using non-volatile memory (NVM) devices such as flash memory. Other types of NVM devices that can be used to implement at least a portion of the storage devices 122 include non-volatile RAM (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices in the storage system 120.

It is therefore to be appreciated numerous different types of storage devices 122 can be used in storage system 120 in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

The term "storage system" as used herein is therefore intended to be broadly construed, and should not be viewed as being limited to particular storage system types, such as, for example, CAS systems, distributed storage systems, or storage systems based on flash memory or other types of NVM storage devices. A given storage system as the term is broadly used herein can comprise, for example, any type of system comprising multiple storage devices, such as network-attached storage (NAS), storage area networks (SANs), direct-attached storage (DAS) and distributed DAS, as well as combinations of these and other storage types, including software-defined storage.

The user devices 102 are configured to interact over the network 104 with the storage system 120. Such interaction illustratively includes generating IO operations, such as write and read requests, and sending such requests over the network 104 for processing by the storage system 120. In some embodiments, each of the user devices 102 comprises a multi-path input/output (MPIO) driver configured to control delivery of IO operations from the host device to the storage system 120 over selected ones of a plurality of paths through the network 104. The paths are illustratively associated with respective initiator-target pairs, with each of a plurality of initiators of the initiator-target pairs comprising a corresponding host bus adaptor (HBA) of the host device, and each of a plurality of targets of the initiator-target pairs comprising a corresponding port of the storage system 120.

The MPIO driver may comprise, for example, an otherwise conventional MPIO driver, such as a PowerPath® driver from Dell Technologies. Other types of MPIO drivers from other driver vendors may be used.

As shown in FIG. 1, the exemplary storage controller 124 comprises a multi-factor authentication module 126 that implements the disclosed storage-side multi-factor authentication techniques, as discussed further below in conjunction with FIG. 3. The storage controller 124 and the storage system 120 may further include one or more additional modules and other components typically found in conventional implementations of storage controllers and storage systems, although such additional modules and other components are omitted from the figure for clarity and simplicity of illustration.

The storage system 120 in some embodiments is implemented as a distributed storage system, also referred to herein as a clustered storage system, comprising a plurality of storage nodes. Each of at least a subset of the storage nodes illustratively comprises a set of processing modules configured to communicate with corresponding sets of processing modules on other ones of the storage nodes. The sets of processing modules of the storage nodes of the storage system 120 in such an embodiment collectively comprise at least a portion of the storage controller 124 of the storage system 120. For example, in some embodiments the sets of processing modules of the storage nodes collectively comprise a distributed storage controller of the distributed storage system 120. A "distributed storage system" as that term is broadly used herein is intended to encompass any storage system that, like the storage system 120, is distributed across multiple storage nodes.

Each storage node of a distributed implementation of storage system 120 illustratively comprises a CPU or other type of processor, a memory, a network interface card (NIC) or other type of network interface, and a subset of the storage devices 122, possibly arranged as part of a disk array enclosure (DAE) of the storage node. These and other references to "disks" herein are intended to refer generally to storage devices, including SSDs, and should therefore not be viewed as limited to spinning magnetic media.

The storage system 120 in the FIG. 1 embodiment is assumed to be implemented using at least one processing platform, with each such processing platform comprising one or more processing devices, and each such processing device comprising a processor coupled to a memory. Such processing devices can illustratively include particular arrangements of compute, storage and network resources. As indicated previously, the user devices 102 (for example, when implemented as host devices) may be implemented in whole or in part on the same processing platform as the storage system 120 or on a separate processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the user devices 102 and the storage system 120 to reside in different data centers. Numerous other distributed implementations of the host devices and the storage system 120 are possible.

As shown in FIG. 1, the exemplary data protection server 105 comprises a multi-factor authentication management interface 112 and a multi-factor authentication enablement module 114, as discussed further below in conjunction with FIG. 2. In one or more embodiments, the multi-factor authentication management interface 112 manages the selective marking of data as protected data, for example, by a user or an application. The protected data itself may come from a user device 102, including an application executed by a host device. The exemplary multi-factor authentication enablement module 114 may be configured to record the markings of the protected data with the storage system 120, for example, as discussed further below in conjunction with FIG. 2.

It is to be appreciated that this particular arrangement of interface 112 and module 114 illustrated in the data protection server 105 of the FIG. 1 embodiment is presented by way of example only, and alternative arrangements can be used in other embodiments. For example, the functionality associated with elements 112 and 114 in other embodiments can be combined into a single module, or separated across a larger number of modules. As another example, multiple distinct processors and/or memory elements can be used to implement different ones of elements 112 and 114 or portions thereof. At least portions of elements 112 and 114 may be implemented at least in part in the form of software that is stored in memory and executed by a processor.

It is further noted that the functionality of data protection server 105 or portions thereof may be implemented by one or more of the user devices 102 and/or the storage controller 124 in other embodiments, as would be apparent to a person of ordinary skill in the art.

Additionally, the data protection server 105 can have an associated database 106 configured to store a protected data identification table 107. Although the protected data identification table 107 is shown in FIG. 1 as a separate component within database 106, in other embodiments, an additional or alternative instance of the protected data identification table 107, or portions thereof, may be incorporated into the data protection server 105 and/or the storage system 120. The protected data identification table 107 may be configured to store, in at least some embodiments, an identification of the data that has been marked as protected data for protection using the disclosed multi-factor authentication techniques.

The database 106 in the present embodiment is implemented using one or more storage systems 120 associated with the data protection server 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the data protection server 105 can be one or more input/output devices (not shown), which illustratively comprise keyboards, displays or other types of input/output devices in any combination. Such input/output devices can be used, for example, to support one or more user interfaces to the data protection server 105, as well as to support communication between the data protection server 105 and other related systems and devices not explicitly shown.

The data protection server 105 in the FIG. 1 embodiment is assumed to be implemented using at least one processing device. Each such processing device generally comprises at least one processor and an associated memory, and implements one or more functional modules for controlling certain features of the data protection server 105. More particularly, data protection server 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

A network interface allows the user devices 102 and/or the data protection server 105 to communicate over the network 104 with each other (as well as one or more other networked devices), and illustratively comprises one or more conventional transceivers.

It is to be understood that the particular set of elements shown in FIG. 1 for access control of protected data using storage system-based multi-factor authentication is presented by way of illustrative example only, and in other embodiments additional or alternative elements may be used. Thus, another embodiment includes additional or alternative systems, devices and other network entities, as well as different arrangements of modules and other components.

Figure 2:
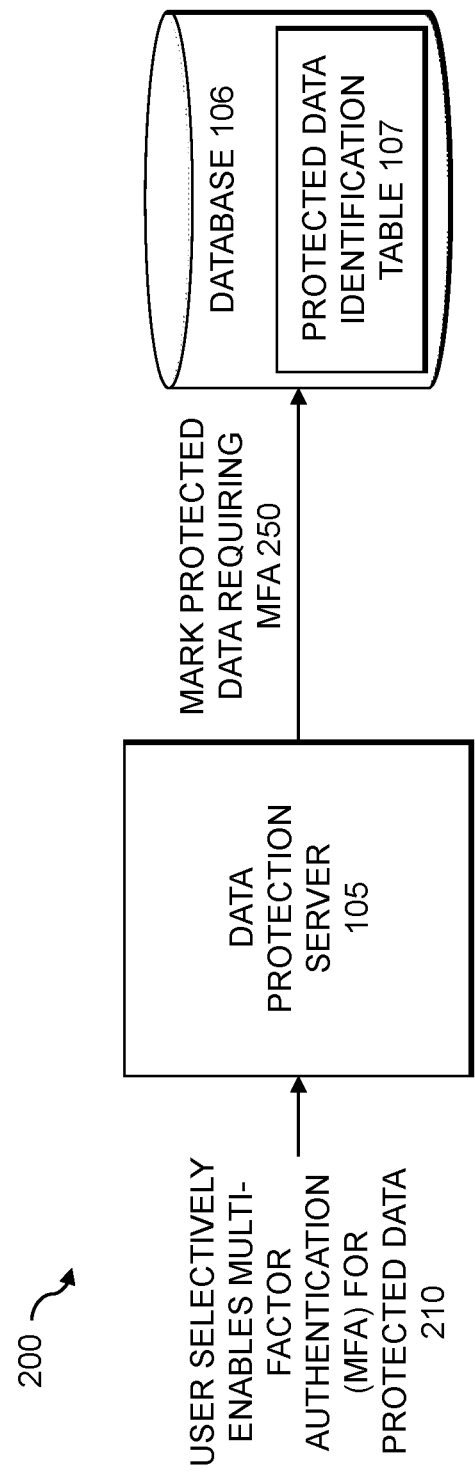
FIG. 2 illustrates a marking of data as protected data using the data protection server of FIG. 1, according to at least one embodiment.

FIG. 2 illustrates an exemplary marking 200 of data as protected data using the data protection server 105 of FIG. 1, according to at least one embodiment. As noted above, data may be marked as protected data by a user and/or an application, for example. As shown in FIG. 2, a user (or an application) enables multi-factor authentication for protected data 210 by sending a marking or another indication to the data protection server 105. In some embodiments, the user employs the multi-factor authentication management interface 112 of the data protection server 105 to selectively mark desired data as protected data. The user may selectively mark all of the data within a given file, folder, and/or data partition as protected data. In addition, the marking may be performed in some embodiments using a manual process and/or an automated process based at least in part on smart tags associated with the data that provide an indication that the data is to be protected as protected data.

After receiving one or more markings of data as protected data 210, the multi-factor authentication enablement module 114 of the data protection server 105 sends markings 250 indicating that the protected data requires multi-factor authentication by the storage system 120. In some embodiments, the markings 250 of particular data as protected data may be recorded in the protected data identification table 107 of database 106. In other embodiments, the markings 250 of particular data as protected data may be recorded (e.g., using a digital marking) in metadata associated with the respective protected data. In accordance with the disclosed techniques for access control of protected data using storage system-based multi-factor authentication, any data that has been marked as protected data 210 will require a successful multi-factor authentication before the protected data 210 can be accessed.

Figure 3:
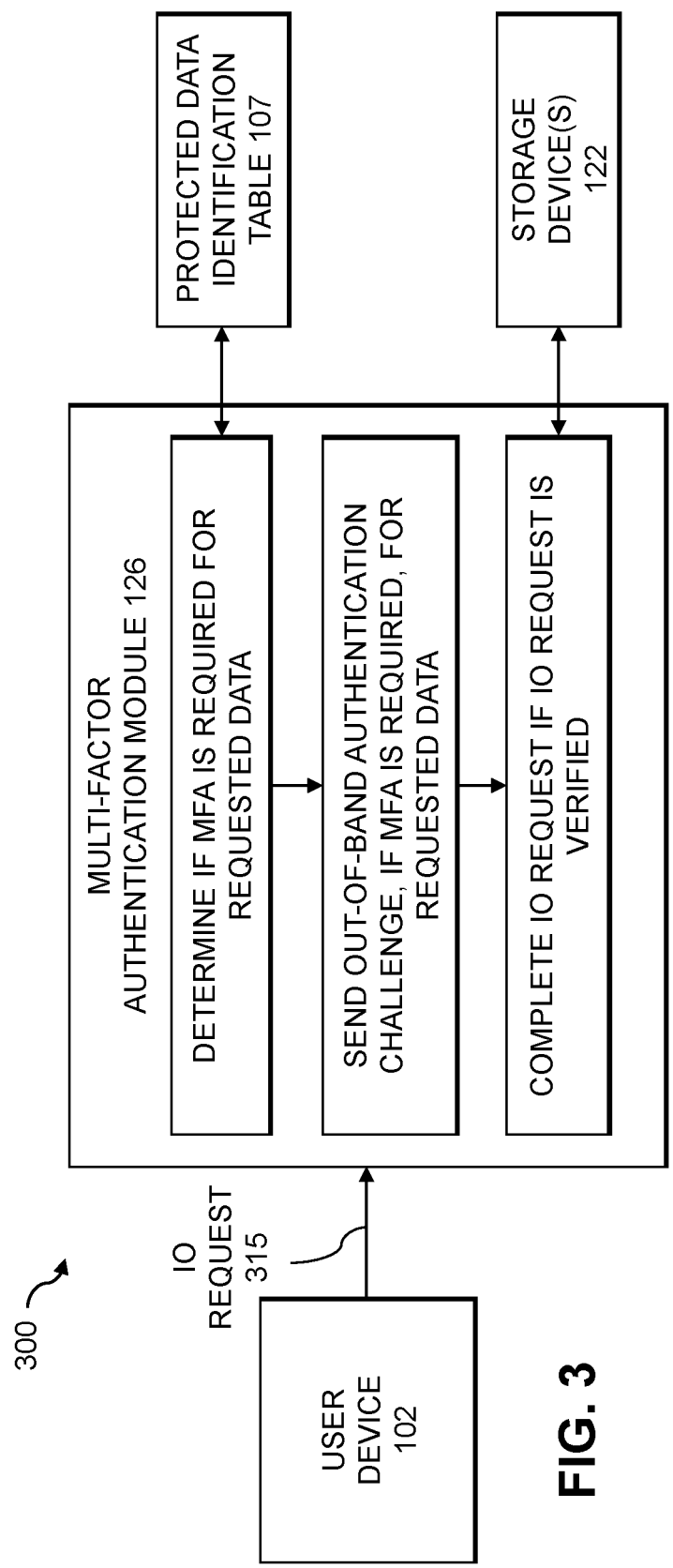
FIG. 3 illustrates an exemplary multi-factor authentication-based protection of stored data within the storage system of FIG. 1, according to one or more embodiments.

FIG. 3 illustrates exemplary multi-factor authentication-based protection 300 of stored data within the storage system 120 of FIG. 1, according to one or more embodiments. As noted above, any data that has been marked as protected data 210, using the techniques discussed above in conjunction with FIG. 2, will require a successful multi-factor authentication before the protected data 210 can be accessed.

For each data access (e.g., for any input/output request 315, such as a read operation or a write operation from a user device 102), the multi-factor authentication module 126 in the storage system 120 will determine if the requested data has been marked as protected data (e.g., by evaluating the protected data identification table 107 or metadata associated with the requested data). For each access of data that has been marked as protected data, a multi-factor authentication will be performed to verify that the intended person (or application) is accessing the protected data. In accordance with the disclosed techniques for access control of protected data using storage system-based multi-factor authentication, the multi-factor authentication is enabled and performed in a storage layer. In this manner, the disclosed data protection techniques are integrated inside the storage system 120 with the additional requirement of a successful multi-factor authentication for any input/output request 315 where the associated data has been marked as protected data 210 (e.g., sensitive data). In this manner, the multi-factor authentication module 126 preserves the multi-factor authentication access requirements regardless of where the data is stored in the storage system 120 (e.g., even if the data is copied or moved).

Figure 4:
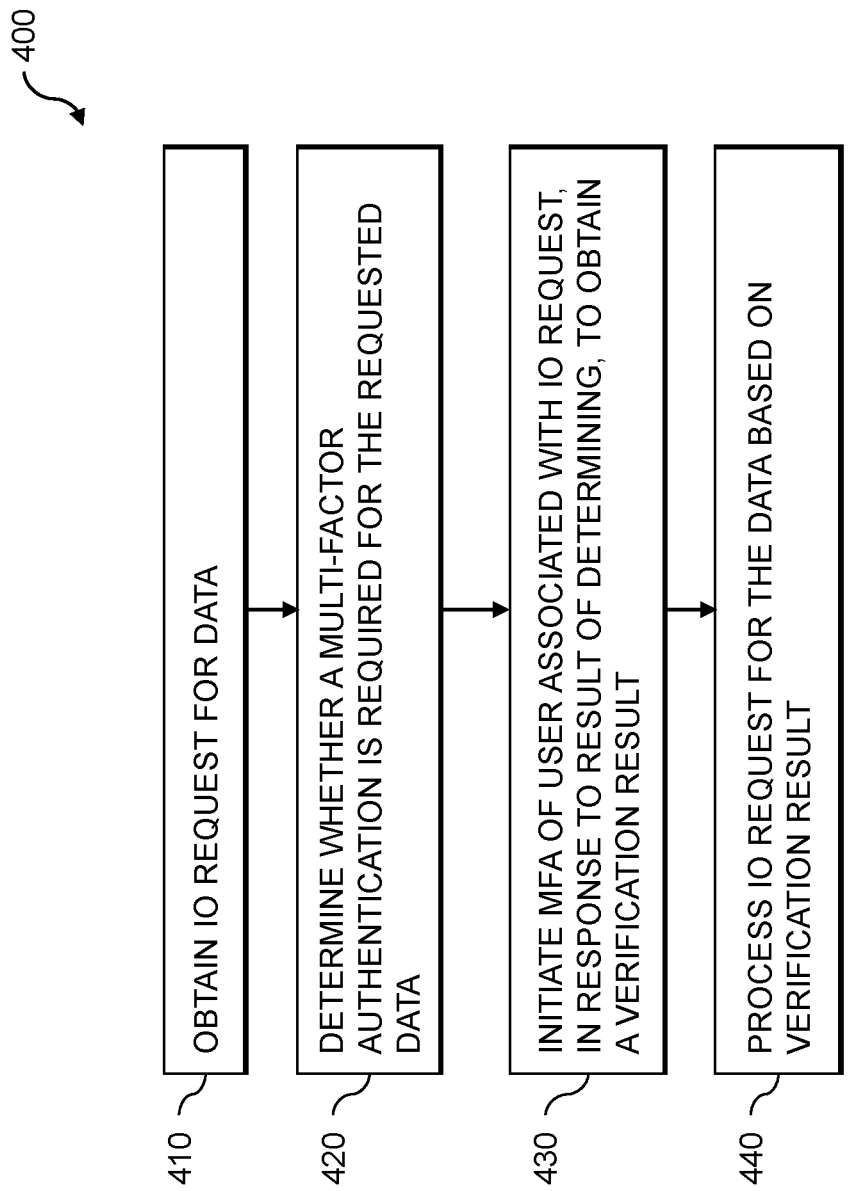
FIG. 4 is a flow diagram illustrating an exemplary implementation of a multi-factor authentication-based process for protecting stored data in a storage system, according to various embodiments.

FIG. 4 is a flow diagram illustrating an exemplary implementation of a multi-factor authentication-based process 400 for protecting stored data in a storage system, according to various embodiments. In the example of FIG. 4, the exemplary multi-factor authentication-based process 400 is performed, for example, by the storage system 120, and initially obtains an input/output request for data in step 410. The multi-factor authentication-based process 400 then determines whether a multi-factor authentication is required for the requested data in step 420. The multi-factor authentication-based process 400 then initiates, by the storage system 120, a multi-factor authentication of a user associated with the input/output request, in response to a result of the determining, to obtain a verification result in step 430. The input/output request for the data is completed in step 440 based at least in part on the verification result.

In some embodiments, a marking of the data as protected data is obtained. The marking of the data as protected data may be performed by a manual process and/or an automated process that processes one or more smart tags associated with the data. The marking of the data as protected data may comprise marking a partition comprising the data, marking a protected folder comprising the data, and/or marking a protected file comprising the data.

In at least one embodiment, the determining whether the multi-factor authentication is required for the requested data further comprises determining whether the data is part of one or more of a protected partition, a protected folder, and a protected file.

The particular processing operations and other network functionality described in conjunction with the flow diagram of FIG. 4 are presented by way of illustrative example only, and should not be construed as limiting the scope of the disclosure in any way. Alternative embodiments can use other types of processing operations for access control of protected data using storage system-based multi-factor authentication. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

One or more embodiments of the disclosure provide improved methods, apparatus and computer program products for access control of protected data using storage system-based multi-factor authentication. The foregoing applications and associated embodiments should be considered as illustrative only, and numerous other embodiments can be configured using the techniques disclosed herein, in a wide variety of different applications.

It should also be understood that the disclosed multi-factor authentication-based protection techniques for stored data, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for access control of protected data using storage system-based multi-factor authentication may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS, IaaS and/or a Function-as-a-Service FaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based multi-factor authentication-based stored data protection engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based multi-factor authentication-based stored data protection platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. These platforms may also be used to implement at least portions of other information processing systems in other embodiments.

Figure 5:
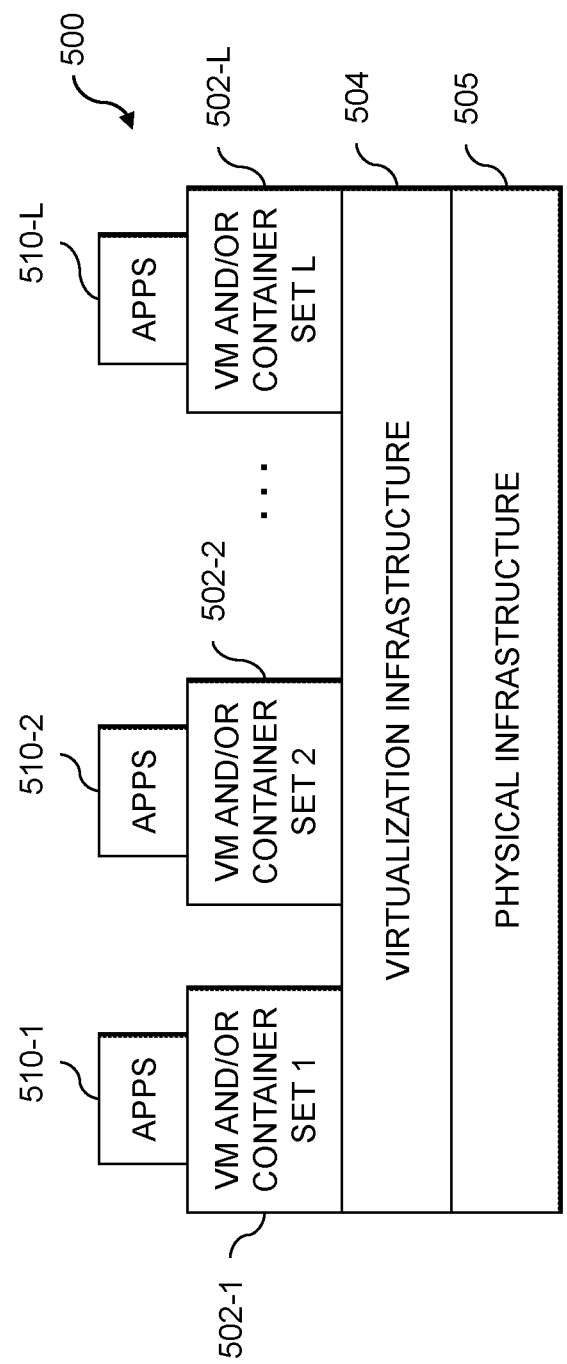
FIG. 5 illustrates an exemplary processing platform that may be used to implement at least a portion of one or more embodiments of the disclosure comprising a cloud infrastructure.

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide multi-factor authentication-based stored data protection functionality of the type described above for one or more processes running on a given one of the VMs. For example, each of the VMs can implement multi-factor authentication-based protection control logic and associated functionality for selectively enabling multi-factor authentication stored data protection for one or more processes running on that particular VM.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide multi-factor authentication-based data protection functionality of the type described above for one or more processes running on different ones of the containers. For example, a container host device supporting multiple containers of one or more container sets can implement one or more instances of multi-factor authentication-based protection control logic and associated functionality for selectively enabling multi-factor authentication stored data protection.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises at least a portion of the given system and includes a plurality of processing devices, denoted 602-1, 602-2, 602-3, . . . 602-K, which communicate with one another over a network 604. The network 604 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an application specific integrated circuit (ASIC), a field programmable gate array (FPGA) or other type of processing circuitry, as well as portions or combinations of such circuitry elements, and the memory 612, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the given system may include additional or alternative processing platforms, as well as numerous distinct processing platforms in any combination, with each such platform comprising one or more computers, storage devices or other processing devices.

Figure 6:
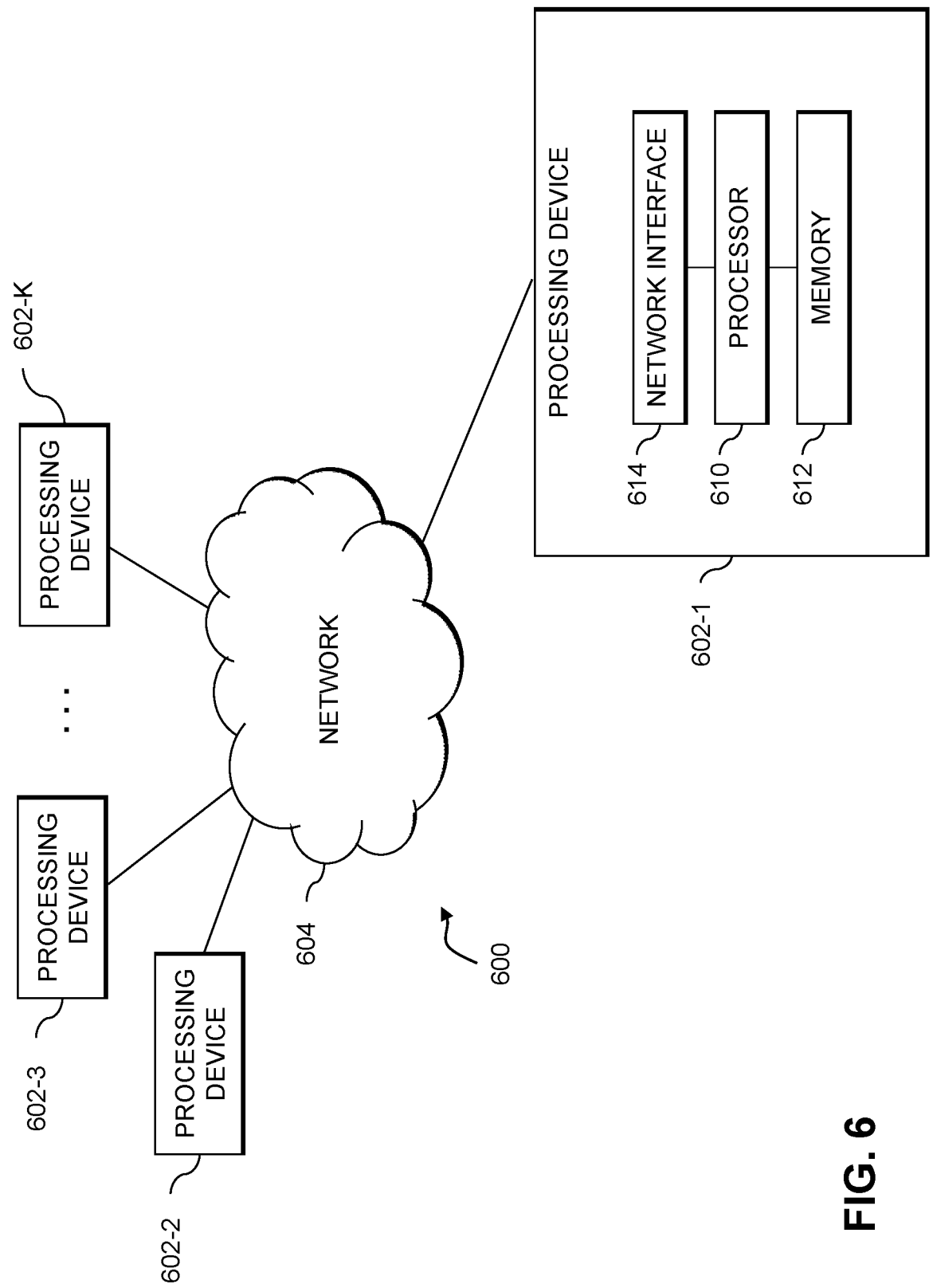
FIG. 6 illustrates another exemplary processing platform that may be used to implement at least a portion of one or more embodiments of the disclosure.

Multiple elements of an information processing system may be collectively implemented on a common processing platform of the type shown in FIG. 5 or 6, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell Technologies.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining, in a storage system, at least one input/output operation requesting data, the storage system comprising at least one processing device and a plurality of storage devices that stores the requested data, the at least one processing device comprising a processor coupled to a memory;

determining, by the storage system, in response to the obtained at least one input/output operation requesting data, whether a multi-factor authentication is required for the requested data by evaluating whether at least a portion of the requested data is marked as protected data, wherein the marking as protected data provides an indication to the storage system to perform a multi-factor authentication in response to a request to access the protected data associated with the at least one input/output operation requesting data;

initiating, by the storage system, the multi-factor authentication of a user associated with the at least one input/output operation, in response to a result of the determining, to obtain a verification result; and processing, in the storage system, the at least one input/output operation requesting data based at least in part on the verification result.

2. The method of claim 1, wherein the multi-factor authentication comprises an out-of-band challenge of the user associated with the at least one input/output operation requesting data.

3. The method of claim 1, further comprising obtaining a marking of the data as protected data.

4. The method of claim 3, wherein the marking of the data as protected data is recorded in one or more of metadata associated with the data and in a protected data database.

5. The method of claim 3, wherein the marking of the data as protected data is performed by one or more of a manual process and an automated process that processes one or more smart tags associated with the data.

6. The method of claim 3, wherein the marking of the data as protected data comprises marking one or more of a partition comprising the data, a protected folder comprising the data, and a protected file comprising the data.

7. The method of claim 3, wherein the protected data can only be accessed if the verification result is successful.

8. The method of claim 3, wherein the marking of the data as protected data is maintained in response to a copy operation or a move operation performed on the data.

9. The method of claim 1, wherein the determining whether the multi-factor authentication is required for the requested data further comprises determining whether the data is part of one or more of a protected partition, a protected folder, and a protected file.

10. An apparatus comprising:
at least one processing device of a storage system comprising a processor coupled to a memory;
the at least one processing device being configured to implement the following steps:
obtaining, in a storage system, at least one input/output operation requesting data, the storage system comprising at least one processing device and a plurality of storage devices that stores the requested data, the at least one processing device comprising a processor coupled to a memory;
determining, by the storage system, in response to the obtained at least one input/output operation requesting data, whether a multi-factor authentication is required for the requested data by evaluating whether at least a portion of the requested data is marked as protected data, wherein the marking as protected data provides an indication to the storage system to perform a multi-factor authentication in response to a request to access the protected data associated with the at least one input/output operation requesting data;
initiating, by the storage system, the multi-factor authentication of a user associated with the at least one input/output operation, in response to a result of the determining, to obtain a verification result; and
processing, in the storage system, the at least one input/output operation requesting data based at least in part on the verification result.

11. The apparatus of claim 10, further comprising obtaining a marking of the data as protected data.

12. The apparatus of claim 11, wherein the marking of the data as protected data is recorded in one or more of metadata associated with the data and in a protected data database.

13. The apparatus of claim 11, wherein the marking of the data as protected data is performed by one or more of a manual process and an automated process that processes one or more smart tags associated with the data.

14. The apparatus of claim 11, wherein the marking of the data as protected data comprises marking one or more of a partition comprising the data, a protected folder comprising the data, and a protected file comprising the data.

15. The apparatus of claim 10, wherein the determining whether the multi-factor authentication is required for the requested data further comprises determining whether the data is part of one or more of a protected partition, a protected folder, and a protected file.

16. A non-transitory processor-readable storage medium having stored therein program code of one or more software programs, wherein the program code when executed by at least one processing device of a storage system causes the at least one processing device to perform the following steps:
obtaining, in a storage system, at least one input/output operation requesting data, the storage system comprising at least one processing device and a plurality of storage devices that stores the requested data, the at least one processing device comprising a processor coupled to a memory;
determining, by the storage system, in response to the obtained at least one input/output operation requesting data, whether a multi-factor authentication is required for the requested data by evaluating whether at least a portion of the requested data is marked as protected data, wherein the marking as protected data provides an indication to the storage system to perform a multi-factor authentication in response to a request to access the protected data associated with the at least one input/output operation requesting data;
initiating, by the storage system, the multi-factor authentication of a user associated with the at least one input/output operation, in response to a result of the determining, to obtain a verification result; and
processing, in the storage system, the at least one input/output operation requesting data based at least in part on the verification result.

17. The non-transitory processor-readable storage medium of claim 16, further comprising obtaining a marking of the data as protected data.

18. The non-transitory processor-readable storage medium of claim 17, wherein the marking of the data as protected data is performed by one or more of a manual process and an automated process that processes one or more smart tags associated with the data.

19. The non-transitory processor-readable storage medium of claim 17, wherein the marking of the data as protected data comprises marking one or more of a partition comprising the data, a protected folder comprising the data, and a protected file comprising the data.

20. The non-transitory processor-readable storage medium of claim 16, wherein the determining whether the multi-factor authentication is required for the requested data further comprises determining whether the data is part of one or more of a protected partition, a protected folder, and a protected file.

\* \* \* \* \*